United States Patent Office 3,278,533
Patented Oct. 11, 1966

3,278,533
7-HYDROXY-6-PTERIDINECARBOXAMIDES AND 7 - MERCAPTO - 6 - PTERIDINETHIOCARBOX-AMIDES
Thomas S. Osdene, Richmond, Va., assignor to American Home Products Corporation, New York, N.Y., a corporation of Delaware
No Drawing. Filed Jan. 7, 1966, Ser. No. 519,212
18 Claims. (Cl. 260—247.2)

This application is a continuation-in-part of co-pending application Serial No. 337,177, filed January 13, 1964, now United States Patent No. 3,254,085.

This invention relates to new and useful 7-hydroxy-pteridinecarboxamides as well as to their corresponding sulfur containing compounds. In particular, the present invention is concerned with 4-amino-7-hydroxy-6-pteridinecarboxamides and 4-amino-7-mercapto-6-pteridine-thiocarboxamides having pharmacodynamic activity.

The novel compounds which are included within the scope of this invention are represented by the following formula:

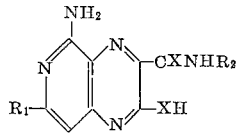

wherein $R_1$ is selected from the group consisting of hydrogen, phenyl, thienyl, halophenyl, lower alkylphenyl, lower alkoxyphenyl, trifluoromethylphenyl, and lower alkyl; $R_2$ is selected from the group consisting of hydrogen, lower alkyl, lower alkoxy(lower) alkyl, di(lower)alkylamino(lower)alkyl, morpholino(lower)alkyl, piperidino (lower)alkyl, N-(lower)alkylpiperazino(lower)alkyl and lower alkylthio(lower)alkyl; and both X atoms are the same and selected from the group consisting of sulfur and oxygen.

The new compounds of the aforesaid formula where both X atoms are oxygen, properly are called "hydroxy-pteridinecarboxamides." Typical examples thereof are: 4 - amino-7-hydroxy-N-(2-morpholinoethyl)-2-phenyl-6-pteridinecarboxamide; 4 - amino-7-hydroxy-2-phenyl-6-pteridinecarboxamide and 4-amino-7-hydroxy-N-(2-methoxyethyl) - 2 - phenyl-6-pteridinecarboxamide. Alternatively when both X atoms are sulfur, the compounds are called "mercaptopteridinethiocarboxamides" such as 4-amino - 7 - mercapto-N-(2-methoxyethyl)-2-phenyl-6-pteridinethiocarboxamide; 4-amino-2-(p-chlorophenyl)-7-mercapto-6-pteridinethiocarboxamide and 4-amino-2-(m-trifluoromethylphenyl) - 7-mercapto-N-(2-methoxyethyl)-6-pteridinethiocarboxamide.

The novel hydroxypteridinecarboxamides of the present invention may be prepared by the interaction of a pteridinecarboxylic acid of the formula;

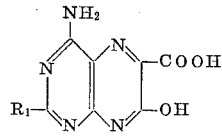

wherein $R_1$ is defined above, with thionyl chloride, at a temperature that is in the range from about 45° C. to about 120° C. for a period of about one to about ten hours. Preferably, this reaction is conducted in excess thionyl chloride at the reflux temperature of the reaction mixture for a period of one to two hours. When the reaction is complete, the mixture is evaporated to dryness and the residue containing the chloride reaction-product is reacted with an amine of the formula: $R_2NH_2$, wherein $R_2$ is as above defined, in a reaction-inert solvent, at a temperature that is in the range of from about 20° C. to about 80° C. for a period of about two to about twenty-four hours. Preferably, this reaction is conducted in dioxane, at about room temperature for a period of twelve to eighteen hours.

After the reaction period, the mixture is cooled and a novel hydroxypteridinecarboxamide product is separated by evaporating the reaction mixture to dryness, treating the residue with water, and filtering the resulting mixture. The solid product may be purified further by recrystallization from a suitable solvent, such as an alkanol, a glycol ether or an amide.

The novel N-substituted-hydroxypteridinecarboxamides of the present invention may also be prepared by the interaction of a 4,6-diamino-5-nitrosopyrimidine of the formula:

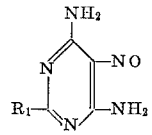

wherein $R_1$ is as defined above, with a malonamide of the formula:

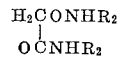

wherein both $R_2$'s are the same and are defined as above but do not include hydrogen, in a lower alkanol, in the presence of a catalytic amount of an alkaline condensation agent, at a temperature that is in the range from about 50° C. to about 120° C. for a period of about 10 minutes to about 12 hours. Preferably, this reaction is conducted in ethanol, in the presence of sodium, at the reflux temperature of the reaction mixture for a period of fifteen to thirty minutes.

After the reaction period, the mixture is cooled and the novel hydroxypteridinecarboxamide product is separated by evaporating the reaction mixture to dryness, treating the residue with hot water, filtering the resulting mixture, acidifying the filtrate with acetic acid and filtering the resulting precipitate. The solid product may then be further purified by recrystallization from a suitable solvent, such as an alkanol or a glycol ether.

The novel mercaptopteridinethiocarboxamides of the present invention may be prepared by the interaction of an above prepared pteridinecarboxamide, with phosphorus pentasulfide, in anhydrous pyridine, at a temperature that is in the range of from about 60° C. to about 115° C. for a period of about one to about twenty-four hours. Preferably, this reaction is conducted at the reflux temperature of the reaction mixture for a period of two to four hours. After the reaction period, the mixture is admixed with hot water and on cooling the mercaptopteridinethiocarboxamide product precipitates. The precipitated product is separated by filtration and may be further purified by recrystallization from a suitable solvent, such as an alkanol, a glycol ether, and ethyl acetate.

The time and temperature ranges employed in the aforesaid reactions are not critical but simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time. By reaction-inert solvent as employed herein is meant a solvent which dissolves the reactants but does not react with them under the described reaction conditions. By the term alkaline condensation agent, it is meant to include agents suitable for promoting the condensation of the above described diaminonitrosopyrimidines and malonamides, such as alkali metals, their alkoxides and their alkoxyalkoxides. Preferred among these catalysts are sodium metal, potassium metal, sodium methoxide, potassium ethoxide and sodium ethoxyethoxide.

Many of the reactants employed in the above described processes to prepare the novel hydroxypteridinecarboxamides and mercaptopteridinethiocarboxamides of the present invention are known compounds which are readily available from commercial sources, while the remainder can easily be prepared in accordance with standard organic procedures well known to those skilled in the art. The 2-substituted pteridinecarboxylic acid reactants are prepared by the acid hydrolysis of the product formed by the interaction of a 4,6-diamino-5-nitroso-2-substituted pyrimidine with an appropriate malonate, as described in Example I.

In accord with the present invention, the novel hydroxypteridinecarboxamides and mercaptopteridinecarboxamides herein described have been found to possess interesting pharmaceutical properties which render them useful as synthetic medicinals. More particularly, in standard pharmacological tests, the hydroxypteridinecarboxamides have exhibited utility as diuretics and anti-inflammatory agents, while the mercaptopteridinethiocarboxamides have demonstrated utility as antibacterial agents. Further, the aforementioned hydroxypteridinecarboxamides have also demonstrated utility as intermediates in the preparation of the mercaptopteridinethiocarboxamides of the present invention.

When the hydroxypteridinecarboxamides of this invention are employed as diuretics and anti-inflammatory agents and the mercaptopteridinethiocarboxamides are employed as antibacterial agents, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally.

In general, the hydroxypteridinecarboxamide compounds of this invention are most desirably administered at a concentration level that will generally afford effective results without causing any harmful or deleterious side effects and preferably at a level that is in the range of from about 0.1 mg. to about 50.0 mg. per kg. of body weight per day, although as aforementioned, variations will occur. However, a dosage level that is in the range of from about 1.0 mg. to about 20.0 mg. per kg. of body weight per day is most desirably employed in order to achieve effective results. Alternatively, the mercaptopteridinethiocarboxamide compounds of this invention are generally administered at a level that is in the range of from about 1.0 mg. to about 100.0 mg. per kg. of body weight per day, while the most desirable dosage is in the range of from about 5.0 mg. to about 30.0 mg. per kg. of body weight per day.

The following examples are given by way of illustration and are not to be construed as limitations of this invention, many variations of which are possible without departing from the scope and spirit thereof.

*Example I*

To a solution of 0.8 g. of sodium in 500 ml. of absolute ethanol is added 6.45 g. of 4,6-diamino-5-nitroso-2-phenylpyrimidine followed by 5.6 g. of diethylmalonate. The mixture is stirred and boiled under reflux for 20 minutes, during which time a precipitate is deposited. After cooling, the precipitate is removed by filtration, dissolved in boiling water, filtered and acidified with acetic acid. The resulting acid precipitates and is recrystallized from aqueous dimethylformamide to afford 4-amino-7-hydroxy-2-phenyl-6-pteridinecarboxylic acid monohydrate, M.P. 276° C., effv.

*Analysis.*—Calcd. for $C_{13}H_{15}N_5O_3$: C, 54.73; H, 3.89; N, 24.55. Found: C, 54.37; H, 4.03; N, 23.94.

*Example II*

One gram of 4-amino-7-hydroxy-2-phenyl-6-pteridinecarboxylic acid is added to 30 ml. of thionyl chloride and the mixture is boiled under reflux for 90 minutes. The mixture is then evaporated to dryness on a rotary evaporator and a solution of 2 g. of 2-morpholinoethylamine dissolved in 20 ml. of dioxane is added to the residue. After allowing the mixture to stand overnight the solvent is removed in vacuo. The residue is treated with water and the solid which forms is removed by filtration.

Recrystallization from 2-ethoxyethanol affords 4-amino-7 - hydroxy - N - (2 - morpholinoethyl) - 2 - phenyl - 6-pteridinecarboxamide, M.P. 281° C.

*Analysis.*—Calcd. for $C_{19}H_{21}N_7O_3$: C, 57.71; H, 5.35; N, 24.80. Found: C, 58.02; H, 5.83; N, 24.95.

In a similar manner, reacting 4-amino-2-(p-bromophenyl)-7-hydroxy-6-pteridinecarboxylic acid with thionyl chloride and 3-morpholinopropylamine produces 4-amino - 2 - (p - bromophenyl) - 7 - hydroxy - N - (3 - morpholinopropyl)-6-pteridinecarboxamide.

*Example III*

A mixture of 1 g. of 4-amino-7-hydroxy-2-phenyl-6-pteridinecarboxylic acid and 35 ml. of thionyl chloride is heated under reflux for 2 hours. The thionyl chloride is then removed on a rotary evaporator, the residue is treated with 20 ml. of 3 N ammonium hydroxide solution, and the mixture is then heated on the steam bath. The solution is filtered and the filtrate acidified with 3 N acetic acid. The precipitate is removed by filtration and recrystallization from aqueous dimethylformamide affords 4-amino - 7 - hydroxy - 2 - phenyl - 6 - pteridinecarboxamide, M.P. 340° C., decomp.

*Analysis.*—Calcd. for $C_{19}H_{22}N_8O_2$: C, 55.31; H, 3.57; N, 29.78. Found: C, 55.54; H, 3.66; N, 29.34.

*Example IV*

Repeating the procedure of Example II and reacting the following pteridinecarboxylic acid chlorides with an appropriate amine, the hereinafter listed products are obtained:

| Starting Materials | Product |
| --- | --- |
| 4-amino-2-(o-ethoxyphenyl)-7-hydroxy-6-pteridinecarboxylic acid and ethylamine. | 4-amino-N-ethyl-2-(o-ethoxyphenyl)-7-hydroxy-6-pteridinecarboxamide. |
| 4-amino-2-butyl-7-hydroxy-6-pteridinecarboxylic acid and 4-methoxybutylamine. | 4-amino-2-butyl-N-(4-methoxybutyl)-7-hydroxy-6-pteridinecarboxamide. |
| 4-amino-7-hydroxy-2-phenyl-6-pteridinecarboxylic acid and 2-piperidinoethylamine. | 4-amino-7-hydroxy-2-phenyl-N-(2-piperidinoethyl)-6-pteridinecarboxamide. |
| 4-amino-7-hydroxy-6-pteridinecarboxylic acid and 2-(N-methylpiperazino)ethylamine. | 4-amino-7-hydroxy-N-[2-(n-methylpiperazino)ethyl]-6-pteridinecarboxamide. |
| 4-amino-2-(p-butoxyphenyl)-7-hydroxy-6-pteridinecarboxylic acid and hexylamine. | 4-amino-2-(p-butoxyphenyl)-N-hexyl-7-hydroxy-6-pteridinecarboxamide. |
| 4-amino-2-methyl-7-hydroxy-6-pteridinecarboxylic acid and 3-diethylaminopropylamine. | 4-amino-N-(3-diethylaminopropyl)-7-hydroxy-2-methyl-6-pteridinecarboxamide. |
| 4-amino-7-hydroxy-6-pteridinecarboxylic acid and 6-diethylaminohexylamine. | 4-amino-N-(6-diethylaminohexyl)-7-hydroxy-6-pteridinecarboxamide. |

*Example V*

To a solution of 0.89 g. of sodium in 500 ml. of absolute ethanol is added 6.45 g. of 4,6-diamino-5-nitroso-2-phenylpyrimidine followed by 7.2 of N,N'-bis(2-methoxyethyl) malonamide and the mixture is refluxed with stirring for 15 minutes. The reaction mixture is then evaporated to dryness on a rotary evaporator and the residue is boiled with 200 ml. of water. The insoluble material is removed by filtration and the filtrate is acidified with 3 N acetic acid. The yellow precipitate which develops is filtered and recrystallized from 2-ethoxyethanol to afford 4-amino-7-hydroxy-N-(2-methoxyphenyl)-2-phenyl-6-pteridinecarboxamide, M.P. 316° C.

*Analysis.*—Calcd. for $C_{16}H_{16}N_6O_3$: C, 56.46; H, 4.74; N, 24.70. Found: C, 56.26; H, 4.52; N, 24.34.

*Example VI*

To a solution of 0.5 g. of sodium in 250 ml. of absolute ethanol is added 3.25 g. of 4,6-diamino-5-nitroso-2-phenylpyrimidine followed by 3.5 g. of N,N'-bis-hexylmalonamide and the mixture is refluxed with stirring for 30 minutes. The reaction mixture is then evaporated to dryness and the residue admixed with 100 ml. of hot water. Thereafter, the solution is filtered and the filtrate acidified with 2 N acetic acid. The resulting precipitate is removed by filtration and recrystallized from ethanol. In this manner, is obtained 4-amino-N-hexyl-7-hydroxy-2-phenyl-6-pteridinecarboxamide, M.P. 258–260° C.

In a similar manner, is obtained 4-amino-N-ethyl-7-hydroxy-(m-iodophenyl)-6-pteridinecarboxamide.

*Example VII*

To a solution of 0.5 g. of potassium in 250 ml. of absolute methanol is added 3.25 g. of 4,6-diamino-5-nitroso-2-phenylpyrimidine followed by 3.5 g. of N,N'-bis-(2-ethylthioethyl)malonamide and the mixture is refluxed with stirring for 30 minutes. The reaction is then evaporated to dryness and the residue admixed with 100 ml. of hot water. The solution is filtered, the filtrate acidified with 2 N acetic acid, and the resulting precipitate is removed by filtration and then recrystallized from ethanol. In this manner, is obtainer 4-amino-N - (2 - ethylthioethyl) - 7 - hydroxy - 2 - phenyl - 6-pteridinecarboxamide, M.P. 276° C.

Similarly, 4 - amino - N - (4 - methylthiobutyl) - 7-hydroxy - 2 - phenyl - 6 - pteridinecarboxamide; 4 - amino - N - (3 - butylthiopropyl) - 7 - hydroxy - 2 - phenyl-6-pteridinecarboxamide and 4-amino-N-(3-ethylthiopropyl)-7-hydroxy-6-pteridinecarboxamide are produced.

*Example VIII*

To a solution of 0.75 g. of sodium ethoxide in 250 ml. of absolute ethanol is added 3.5 g. of 4,6-diamino-5-nitroso-2-(2-thienyl)pyrimidine followed by 3.5 g. of N,N'-bis-(2-ethoxyethyl)malonamide and the mixture is refluxed with stirring for 45 minutes. The reaction mixture is then evaporated to dryness and the residue admixed with 200 ml. of boiling water. The resulting solution is filtered and the filtrate acidified with 1 N acetic acid. The precipitate which develops is removed by filtration and recrystallized from ethanol. In this manner, is obtained 4-amino-N-(2-ethoxyethyl)-7-hydroxy-2-(2-thienyl)-6-pteridinecarboxamide, M.P. 292° C.

In the same manner, reacting 4,6-diamino-2-(p-tolyl)-5-nitrosopyrimidine with N,N'-bis-pentoxymethylmalonamide produces 4-amino-7-hydroxy-N-pentoxymethyl-2-(p-tolyl)-6-pteridinecarboxamide.

*Example IX*

To a solution of 0.8 of potassium methoxide in 300 ml. of absolute methanol is added 3.60 g. of 4,6-diamino-5 - nitroso - 2 - (p - chlorophenyl)pyrimidine followed by 3.5 g. of N,N'-bis-(2-ethoxyethyl)malonamide and the mixture is refluxed with stirring for 20 minutes. The reaction mixture is then evaporated to dryness and the residue admixed with 100 ml. of boiling water. The resulting solution is filtered, the filtrate acidified with 3 N acetic acid, and the precipitate which develops is removed by filtration and recrystallized from ethanol. In this manner, is obtained 4-amino-2-(p-chlorophenyl)-N-(2-ethoxyethyl)-7-hydroxy-6-pteridinecarboxamide, M.P. 310° C.

*Example X*

To a solution of 0.5 g. of sodium in 250 ml. of absolute ethanol is added 3.25 of 4,6-diamino-5-nitroso-2-(n-propyl)pyrimidine followed by 3.5 g. of N,N'-bis-(2-ethoxyethyl)malonamide and the mixture is refluxed with stirring for 50 minutes. The reaction mixture is then evaporated to dryness and the residue admixed with 150 ml. of hot water. The resulting solution is filtered and the filtrate acidified with 2 N acetic acid. The precipitate which develops is removed by filtration and recrystallized from ethanol. In this manner, is obtained 4-amino - N - (2 - ethoxyethyl) - 7 - hydroxy - 2 - (n - propyl)-6-pteridinecarboxamide, M.P. 253° C.

Similarly, 4 - amino - N - (2 - ethoxyethyl) - 2 - (p-ethylphenyl) - 7 - hydroxy - 6 - pteridinecarboxamide and 4 - amino - 7 - hydroxy - N - (6 - propoxyhexyl) - 6-pteridinecarboxamide are synthesized.

*Example XI*

To a solution of 0.8 g. of sodium ethoxide in 200 ml. of absolute ethanol is added 3.25 g. of 4,6-diamino-5-nitroso-2-phenylpyrimidine followed by 3.5 g. of N,N'-bis-ethylmalonamide and the mixture is refluxed with stirring for 20 minutes. The reaction mixture is then evaporated to dryness and the residue admixed with 100 ml. of hot water. The resulting solution is filtered and the filtrate acidified with 3 N acetic acid. The precipitate which develops is removed by filtration and recrystallized from 2-ethoxyethanol. In this manner, is obtained 4-amino-N - ethyl - 7 - hydroxy - 2 - phenyl - 6 - pteridinecarboxamide, M.P. 360° C.

*Example XII*

To a solution of 0.5 g. of sodium in 300 ml. of absolute ethanol is added 3.4 g. of 4,6-diamino-5-nitroso-2-phenylpyrimidine followed by 3.5 g. of N,N'-bis-methylmalonamide and the mixture is refluxed with stirring for 60 minutes. The reaction mixture is then evaporated to dryness and the residue admixed with 125 ml. of water. The resulting solution is filtered, the filtrate acidified with 2 N acetic acid, and the precipitate which develops is removed by filtration and recrystallized from ethanol. In this manner, is obtained 4-amino-7-hydroxy-N-methyl-2-phenyl-6-pteridinecarboxamide, M.P. 320° C.

Utilizing the above procedure, the following compounds are produced:

4-amino-7-hydroxy-N-methyl-2-(3-thienyl)-6-pteridine-carboxamide;

4-amino-N-ethyl-7-hydroxy-2-(p-trifluoromethylphenyl)-6-pteridinecarboxamide; and 4-amino-N-butyl-7-hydroxy-2-(p-propylphenyl)-6-pteridinecarboxamide.

Example XIII

To a solution of 1.0 g. of sodium in 500 ml. of absolute ethanol is added 6.50 g. of 4,6-diamino-5-nitroso-2-phenylpyrimidine followed by 7.0 g. of N,N′-bis-propylmalonamide and the mixture is refluxed with stirring for 20 minutes. The reaction mixture is then evaporated to dryness and the residue admixed with 200 ml. of hot water. The resulting solution is filtered and the filtrate acidified with 2 N acetic acid. The precipitate which develops is removed by filtration and recrystallized from 2-ethoxyethanol. In this manner, is obtained 4 - amino - 7 - hydroxy - 2 - phenyl - N - propyl - 6-pteridinecarboxamide, M.P. 300–301° C.

Similarly, 4 - amino - N - butyl - 7 - hydroxy - 2-phenyl-6-pteridinecarboxamide, M.P. 296° C. is produced.

Example XIV

Two grams of dried 4-amino-7-hydroxy-6-pteridinecarboxylic acid is added to 60 ml. of thionyl chloride and the mixture is boiled under reflux for 180 minutes, at which time evolution of HCl ceases. The mixture is evaporated to dryness on a rotary evaporator and a solution of 4 g. of 4-piperidinobutylamine dissolved in 40 ml. of dioxane is added to the residue. After allowing the mixture to stand overnight the solvent is removed in vacuo and the residue is treated with water. The solid which forms is removed by filtration and recrystallization from 2-ethoxyethanol affords 4-amino-7-hydroxy-N-(4-piperidinobutyl)-6-pteridinecarboxamide.

Similarly, 4-amino-7-hydroxy-N-piperidinoethyl-6-pteridinecarboxamide and 4-amino-7-hydroxy-N-[2-(N-amylpiperazino)ethyl]-2-phenyl - 6 - pteridinecarboxamide are synthesized.

Example XV

One gram of dried 4-amino-7-hydroxy-2-phenyl-6-pteridinecarboxylic acid is added to 30 ml. of thionyl chloride and the mixture is boiled under reflux for 90 minutes. The mixture is evaporated to dryness and a solution of 2 g. of morpholinobutylamine dissolved in 20 ml. of dioxane is added to the residue. After allowing the mixture to stand overnight the solvent is removed in vacuo. The residue is treated with water, the solid which forms is removed by filtration and recrystallization from 2-ethoxyethanol affords 4 - amino - 7-hydroxy - N-(2-morpholinobutyl)-2-phenyl-6-pteridinecarboxamide.

In a similar manner, 4-amino-N-[3-(N-butylpiperazino)propyl]-7-hydroxy-2-methyl - 6 - pteridinecarboxamide and 4-amino-7-hydroxy-2-propyl-N-(N-propylpiperazinomethyl)-6-pteridinecarboxamide are produced.

Example XVI

To 250 ml. of dry pyridine is added 10.2 g. of 4-amino-7 - hydroxy-N-(2-methoxyethyl)-2-phenyl-6-pteridinecarboxamide and 14.65 g. of phosphorus pentasulfide. The mixture is stirred and boiled under reflux for 2 hours. The orange mixture which develops is poured into 1500 ml. of boiling water and after cooling, the precipitate which forms is removed by filtration. After drying, the material is recrystallized from ethyl acetate to afford 4 - amino - N - (2-methoxyethyl)-7-mercapto-2-phenyl-6-pteridinethiocarboxamide, M.P. 246° C.

*Analysis.*—Calcd. $C_{16}H_{16}S_2N_6O$: C, 51.59; H, 4.33; N, 22.56; S, 17.22. Found: C, 5169; H, 4.37; N, 22.61; S, 16.8.

Example XVII

To 500 ml. of anhydrous pyridine is added 20.5 g. of 4-amino - 7 - hydroxy-N-(2-morpholinoethyl)-2-phenyl-6-pteridinecarboxamide, as prepared in Example II, and 30.3 g. of phosphorus pentasulfide. The mixture is stirred and boiled under reflux for 3 hours. The reaction mixture is then poured into 1500 ml. of boiling water and after cooling, the precipitate which forms is removed by filtration. After drying, the material is recrystallized from ethyl acetate to afford 4-amino-7-mercapto-N-(2-morpholinoethyl)-2-phenyl-6-pteridinethiocarboxamide.

In a similar manner, 4-amino-N-(dimethylaminomethyl)-7-mercapto-2-phenyl-6-pteridinethiocarboxamide and 4 - amino-N-(2-dibutylaminoethyl)-2-methyl-7-mercapto-6-pteridinethiocarboxamide are produced.

Example XVIII

To 100 ml. of anhydrous pyridine is added 4.0 g. of 4-amino-7-hydroxy-N-(2-morpholinoethyl) - 2 - (p-tolyl)-6-pteridinecarboxamide and 7.3 g. of phosphorus pentasulfide and the mixture is refluxed for 5 hours. Thereafter, the reaction mixture is admixed with 600 ml. of hot water. Upon cooling, the precipitated product is filtered and recrystallized from ethyl acetate. In this manner, is obtained 4-amino-7-mercapto-N-(2-morpholinoethyl)-2-(p-tolyl)-6-pteridinethiocarboxamide.

Example XIX

To 250 ml. of dry pyridine is added 7.0 g. of 4-amino-2 - (p - chlorophenyl)-7-hydroxy-6-pteridinecarboxamide and 16.4 g. of phosphorus pentasulfide and the mixture is refluxed for two hours. Thereafter, the reaction mixture is admixed with 1500 ml. of hot water and, on cooling, the precipitated product is filtered and recrystallized from ethanol. In this manner, is obtained 4-amino-2-(p-chlorophenyl)-7-mercapto-6-pteridinethiocarboxamide.

In a similar manner, 4-amino-7-mercapto-2-phenyl-N-propyl-6-pteridinethiocarboxamide; 4-amino-N-(2-ethoxyethyl)-7-mercapto - 2 - (n-propyl)-6-pteridinethiocarboxamide and 4 - amino-N-(3-ethylthiopropyl)-7-mercapto-6-pteridinethiocarboxamide are synthesized.

Example XX

To 50 ml. of anhydrous pyridine is added 2.0 g. of 4-amino - 7 - hydroxy-N-(2-methoxyethyl)-2-(m-trifluoromethylphenyl)-6-pteridinecarboxamide and 3.0 g. of phosphorus pentasulfide and the mixture is heated to 100° C. for 6 hours. Thereafter, the reaction mixture is admixed with 300 ml. of boiling water and the precipitate which develops on cooling is filtered and recrystallized from methanol. In this manner, is obtained 4-amino-N-(2-methoxyethyl) - 7-mercapto-2-(m-trifluoromethylphenyl)-6-pteridinethiocarboxamide.

In a similar manner, the following compounds were produced: 4 - amino - 2-butyl-7-mercapto-N-(4-methoxybutyl)-6-pteridinethiocarboxamide; 4-amino-N-(2-dibutylaminoethyl) - 7-mercapto-2-(p-propylphenyl)-6-pteridinethiocarboxamide; and 4-amino-N-(3-diethylaminopropyl)-7-mercapto-6-pteridinethiocarboxamide.

Example XXI

To 500 ml. of pyridine is added 20.0 g. of 4-amino-N-ethyl-7-hydroxy-2-(2-thienyl)-6-pteridinecarboxamide and 30.0 g. of phosphorus pentasulfide and the mixture is heated to 60° for 15 hours. Thereafter, the reaction mixture is admixed with 3000 ml. of hot water. Upon cooling, the precipitated product is filtered and recrystallized from butanol to afford 4-amino-N-ethyl-7-mercapto-2-(2-thienyl)-6-pteridinethiocarboxamide.

Example XXII

To 250 ml. of dry pyridine is added 10.0 g. of 4-amino-N - (2-ethylthioethyl)-7-hydroxy-2-(p-methoxyphenyl)-6- pteridinecarboxamide and 15.0 g. of phosphorus pentasulfide and the mixture is heated to 90° C. for 10 hours. Thereafter, the reaction mixture is admixed with 150 ml. of boiling water. The product precipitates, is filtered and recrystallized from ethyl acetate. In this manner, is obtained 4 - amino - N - (2-ethylthioethyl)-7-mercapto-2-(p-methoxyphenyl)-6-pteridinethiocarboxamide.

*Example XXIII*

The procedure of Examples XVI to XXII is repeated to prepare the following mercaptopteridinethiocarboxamides from the corresponding hydroxypteridinecarboxamides which are prepared in Example IV.

4-amino-2-(o-ethoxyphenyl)-N-ethyl-7-mercapto-6-pteridinethiocarboxamide;
4-amino-2-butyl-7-mercapto-N-(4-methoxybutyl)-6-pteridinethiocarboxamide;
4-amino-7-mercapto-2-phenyl-N-(2-piperidinoethyl)-6-pteridinethiocarboxamide;
4-amino-7-mercapto-N-[2-N-methylpiperazino)ethyl]-6-pteridinethiocarboxamide;
4-amino-2-(p-butoxyphenyl)-N-hexyl-7-mercapto-6-pteridinethiocarboxamide;
4-amino-N-(3-diethylaminopropyl)-7-mercapto-2-methyl-6-pteridinethiocarboxamide; and
4-amino-N-(6-diethylaminohexyl)-7-mercapto-6-pteridinethiocarboxamide.

*Example XXIV*

To 1000 ml. of anhydrous pyridine is added 40.0 g. of 4 - amino - 7 - hydroxy - 2 - (p - iodophenyl) - N - (3-morpholinopropyl)-6-pteridinecarboxamide and 60.0 g. of phosphorus pentasulfide and the mixture is refluxed for 5 hours. Thereafter, the reaction mixture is admixed with 6000 ml. of hot water. Upon cooling, the precipitated product is filtered and recrystallized from ethyl acetate. In this manner, is obtained 4-amino-2-(p-iodophenyl)-7-mercapto-N-(3-morpholinopropyl)-6-pteridinethiocarboxamide.

Similarly, reacting 4 - amino - 7 - hydroxy-N-piperidinoethyl-6-pteridinecarboxamide with phosphorus pentasulfide produces 4-amino-7-mercapto-N-piperidinomethyl-6-pteridinethiocarboxamide.

*Example XXV*

A mixture of 2 g. of 4-amino-2-(p-methoxyphenyl)-7-hydroxy-6-pteridinecarboxylic acid and 70 ml. of thionyl chloride is heated under reflux for 2.5 hours. The thionyl chloride is then removed on a rotary evaporator, the residue is treated with 40 ml. of 3 N ammonium hydroxide solution, and the mixture is then heated on the steam bath. The solution is filtered and the filtrate acidified with 3 N acetic acid. The precipitate is removed by filtration and recrystallization from aqueous dimethylformamide affords 4 - amino - 2 - (p - methoxyphenyl) - 7 - hydroxy - 6-pteridinecarboxamide.

In a similar manner, 4-amino-2-(p-fluorophenyl)-7-hydroxy-6-pteridinecarboxamide and 4-amino-2-(o-hexylphenyl)-7-hydroxy-6-pteridinecarboxamide are synthesized.

What is claimed is:
1. A compound selected from the group consisting of those having the formula:

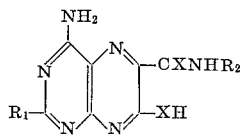

wherein $R_1$ is selected from the group consisting of hydrogen, phenyl, thienyl, halophenyl, lower alkylphenyl, lower alkoxyphenyl, trifluoromethylphenyl, and lower alkyl; $R_2$ is selected from the group consisting of hydrogen, lower alkyl, lower alkoxy(lower)alkyl, di(lower)alkylamino(lower)alkyl, morpholino(lower)alkyl, piperidino(lower)alkyl, N-(lower)alkylpiperazino(lower)alkyl and lower alkylthio(lower)alkyl; and both X atoms are the same and selected from the group consisting of sulfur and oxygen.

2. A compound as described in claim 1 which is: 4-amino - 7 - hydroxy - N - (2 - morpholinoethyl) - 2-phenyl-6-pteridinecarboxamide.

3. A compound as described in claim 1 which is: 4-amino-7-hydroxy-2-phenyl-6-pteridinecarboxamide.

4. A compound as described in claim 1 which is: 4-amino - 7 - hydroxy - N - (2 - methoxyethyl) - 2 - phenyl-6-pteridinecarboxamide.

5. A compound as described in claim 1 which is: 4-amino - N - hexyl - 7 - hydroxy - 2 - phenyl - 6 - pteridinecarboxamide.

6. A compound as described in claim 1 which is: 4-amino - N - (2 - ethylthioethyl) - 7 - hydroxy - 2 - phenyl-6-pteridinecarboxamide.

7. A compound selected from the group consisting of those having the formula:

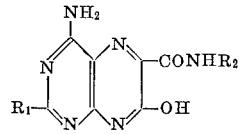

wherein $R_1$ is selected from the group consisting of hydrogen, phenyl, thienyl, halophenyl, lower alkylphenyl, lower alkoxyphenyl, trifluoromethylphenyl, and lower alkyl; and $R_2$ is selected from the group consisting of hydrogen, lower alkyl, lower alkoxy(lower)alkyl, di(lower)alkylamino(lower)alkyl, morpholino(lower)alkyl, piperidino(lower)alkyl, N-(lower)alkylpiperazino(lower)alkyl and lower alkylthio(lower)alkyl.

8. A compound as described in claim 7 which is: 4-amino - N - (2 - ethoxyethyl) - 7 - hydroxy - 2 - (2 - thienyl)-6-pteridinecarboxamide.

9. A compound as described in claim 7 which is: 4-amino - 2 - (p - chlorophenyl) - N - (2 - ethoxyethyl) - 7-hydroxy-6-pteridinecarboxamide.

10. A compound as described in claim 7 which is: 4-amino - N - (2 - ethoxyethyl) - 7 - hydroxy - 2 - (n-propyl)-6-pteridinecarboxamide.

11. A compound as described in claim 7 which is: 4-amino-N-ethyl - 7-hydroxy-2-phenyl - 6-pteridinecarboxamide.

12. A compound as described in claim 7 which is: 4-amino - 7-hydroxy-N-methyl - 2-phenyl - 6-pteridinecarboxamide.

13. A compound selected from the group consisting of those having the formula:

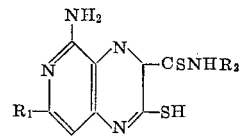

wherein $R_1$ is selected from the group consisting of hydrogen, phenyl, thienyl, halophenyl, lower alkylphenyl, lower alkoxyphenyl, trifluoromethylphenyl, and lower alkyl; and $R_2$ is selected from the group consisting of hydrogen, lower alkyl, lower alkoxy (lower)alkyl, di(lower)alkylamino(lower)alkyl, morpholino(lower)alkyl, piperidino(lower)alkyl, N-(lower)alkylpiperazino(lower) alkyl and lower alkylthio(lower)alkyl.

14. A compound as described in claim 13 which is: 4-amino - 7-mercapto-N-(2-methoxyethyl) - 2-phenyl - 6-pteridinethiocarboxamide.

15. A compound as described in claim 13 which is: 4-amino - 2-(p-chlorophenyl) - 7-mercapto-6-pteridinethiocarboxamide.

16. A compound as described in claim 13 which is: 4-amino - 2-(m-trifluoromethylphenyl) - 7-mercapto-N-(2-methoxyethyl)-6-pteridinethiocarboxamide.

17. A compound as described in claim 13 which is: 4-amino-N-ethyl-7-mercapto - 2-(2-thienyl)-6-pteridinethiocarboxamide.

18. A compound as described in claim 13 which is: 4-amino-N-(2-ethylthioethyl) - 7-mercapto - 2-(p-methoxyphenyl)-6-pteridinethiocarboxamide.

No references cited.

ALEX MAZEL, *Primary Examiner.*

J. TOVAR, *Assistant Examiner.*

UNITED STATES PATENT OFFICE
CERTIFICATE OF CORRECTION

Patent No. 3,278,533

October 11, 1966

Thomas S. Osdene

It is hereby certified that error appears in the above numbered patent requiring correction and that the said Letters Patent should read as corrected below.

Column 1, formula 1 should appear as shown below instead of as in the patent:

column 5, line 63, for "obtainer" read -- obtained --; column 7, line 74, for "5169" read -- 51.69 --; column 10, the formula in claim 13 should appear as shown below instead of as in the patent:

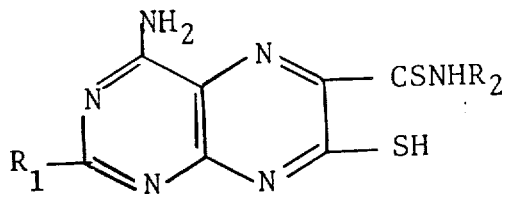

Signed and sealed this 29th day of August 1967.

(SEAL)
Attest:

ERNEST W. SWIDER
Attesting Officer

EDWARD J. BRENNER
Commissioner of Patents